United States Patent Office 3,306,930
Patented Feb. 28, 1967

3,306,930
CYCLIC METHOD OF PREPARING VINYL ACETATE
Harry B. Copelin, Niagara Falls, and Melvin J. Freamo, North Tonawanda, N.Y., and Owen B. Mathre, Memphis, Tenn., assignors to E. I. du Pont de Nemours and Company, Wilmington, Del., a corporation of Delaware
No Drawing. Filed Aug. 17, 1964, Ser. No. 390,223
2 Claims. (Cl. 260—497)

This invention relates to the production of vinyl acetate from ethylene and particularly to an improvement in the known method wherein vinyl acetate is produced by the reaction of ethylene with a catalyzed acetic acid working solution.

The production of vinyl acetate by the reaction of ethylene with an acetic acid solution of a palladium II salt, an ionizable metal acetate and generally also an oxidizing agent such as a cupric salt, is disclosed by Moiseev et al., Doklady Akad. Nauk SSSR, 133, 377 (1960), and in British Patent 928,739 and Belgian Patent 608,610. The purpose of the oxidizing agent in the acetic acid solution (the working solution) is to maintain the palladium salt in its +2 valence state. The oxidizing agent, which becomes reduced during use of the working solution, may be reoxidized for further use by means of oxygen supplied with the ethylene, or such reoxidation or regeneration of the reduced oxidizing agent may be effected in a separate operation.

The reaction to produce vinyl acetate is regarded as occurring between ethylene and the metal acetate, probably through the intermediate formation of an ethylene-palladium II salt complex such as $(C_2H_4 \cdot PdCl_2)_2$. When the metal acetate is cupric acetate, which would also function as the oxidizing agent, the reaction to produce vinyl acetate may be represented by Equation A, the regeneration or oxidation reaction may be represented by Equation B and the net overall reaction may be represented by Equation C, in which equations "Ac" stands for the

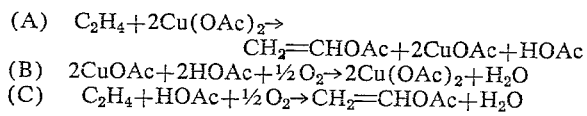

radical.

(A) $C_2H_4 + 2Cu(OAc)_2 \rightarrow CH_2=CHOAc + 2CuOAc + HOAc$
(B) $2CuOAc + 2HOAc + \frac{1}{2}O_2 \rightarrow 2Cu(OAc)_2 + H_2O$
(C) $C_2H_4 + HOAc + \frac{1}{2}O_2 \rightarrow CH_2=CHOAc + H_2O$ Some acetaldehyde will be formed along with the vinyl acetate, particularly if the working solution contains a substantial amount of water, since the presence of the palladium salt actively catalyzes hydrolysis of vinyl acetate to acetaldehyde. Actually, formation of acetaldehyde along with the vinyl acetate can be beneficial in that when carrying out a cyclic two-stage operation in the second stage of which the reduced copper salt is reoxidized to the cupric form, the acetaldehyde can be oxidized to acetic acid in the working solution in the second stage. Such a method of converting by-product acetaldehyde to acetic acid and simultaneously regenerating the working solution for reuse is described in the pending Copelin application, Serial No. 345,507, filed March 2, 1964. By controlling the amount of acetaldehyde produced and converting it to acetic acid by the method of the above application, the process can be made self-sufficient with respect to acetic acid and the synthesis of vinyl acetate may be represented by the over-all reaction:

(D) $2C_2H_4 + \frac{3}{2}O_2 \rightarrow CH_2=CHOAc + H_2O$

Glycol acetates are generally produced in small but significant amounts as by-products of such methods for producing vinyl acetate from ethylene. The separation of these glycol acetates from the working solution is difficult and their formation represents a loss in raw material values. While it is known that glycol acetates can be cracked at high temperatures to vinyl acetate and acetaldehyde, such cracking operations would require separate facilities and would not eliminate the problem of recovering the glycol acetates from the vinyl acetate working solution.

It is an object of the invention to provide an improvement in the above method of producing vinyl acetate from ethylene whereby by-product glycol acetates are usefully consumed within the vinyl acetate process. A particular object is to provide a method whereby the glycol acetate by-products are converted within the working solution of the process to acetaldehyde which can be readily converted to acetic acid to supply at least part of the acetic acid requirements. Still further objects will be apparent from the following description.

Whether the working solution is reacted with a mixture of ethylene and oxygen so that formation of vinyl acetate and reoxidation of the reduced oxidizing agent occur simultaneously, or whether the working solution is first reacted with ethylene and the reduced solution is then reoxidized in a separate operation, it is the usual practice to separate vinyl acetate and all by-products such as acetaldehyde and glycol acetates from the working solution following the reaction with ethylene, and the residual working solution is then recycled for reaction with further amounts of ethylene. It has now been discovered that by deliberately permitting the glycol acetates by-products produced in the synthesis step (i.e., the step in which ethylene is reacted with the working solution to form vinyl acetate) of such a cyclic system to remain in the working solution that is recycled to the synthesis step, they can be converted in the latter step to acetaldehyde. The latter, as noted previously, can be readily converted to acetic acid to supply all or part of the acetic acid requirements.

Accordingly, the objects of the invention are realized by reacting ethylene with a working solution of the type indicated in a synthesis step to form vinyl acetate and glycol acetates as by-products, removing or stripping the vinyl acetate product from the reacted working solution, and recycling the stripped working solution with the by-product glycol acetates therein, to the synthesis step for reaction with further amounts of ethylene. The glycol acetates recycled to the synthesis step are converted, at least in part, in the synthesis step to acetaldehyde which is separated along with the vinyl acetate product from the working solution in the stripping step.

The acetaldehyde produced from the glycol acetates in the above manner can be used for any purpose but is preferably converted to acetic acid to supply at least part of the acetic acid required by the cyclic operation. The acetaldehyde can be oxidized to acetic acid in any desired way but this is preferably effected by the method of the above Copelin application Serial No. 345,507. That method involves the employment of a cyclic 2-stage vinyl acetate synthesis system using a working solution containing a cupric salt as the oxidizing agent. In the first or synthesis stage, ethylene is reacted with the recycled oxidized working solution to produce vinyl acetate and acetaldehyde. In the second stage, the reduced working solution with the acetaldehyde therein is reacted with oxygen to oxidize the acetaldehyde to acetic acid and simultaneously reoxidize the reduced working solution for recycling. The vinyl acetate product is removed and recovered between the first and second stages of the cycle.

The synthesis step is carried out by continuously contacting and reacting the working solution with ethylene at a temperature of 50 to 160° C. and an ethylene pressure of 50 to 2000 p.s.i.g. Preferably, temperatures of 80 to 130° C. and ethylene pressures of 100 to 500 p.s.i.g., are used and the working solution will be efficiently agitated during the reaction. When using a 2-stage system, the reduced working solution from the first stage is re-oxidized in the second stage by being continuously contacted and reacted under agitation with oxygen at a temperature of 50 to 150° C., preferably 80 to 130° C. The oxidation can be effected using oxygen or an oxygen-containing gas such as air or oxygen-enriched air. Oxygen partial pressures of from 0.001 to 2 atmospheres are generally suitable, the preferred partial pressures being 0.1 to 1 atmosphere.

The working solution, in its oxidized state, is an acetic acid solution of a palladium II salt, an ionizable metal acetate and a cupric salt oxidizing agent. It will preferably also contain a soluble metal halide or bromide. It may also contain a minor amount of water, generally not more than 20% thereof, based upon the weight of the solvent components of the working solution. Unless it is particularly desired to increase by-product acetaldehyde formation for the co-production of acetic acid, for example, by the method of the above-mentioned Copelin application, the water content will generally be maintained at not more than about 3% of the weight of the solvent.

Suitable palladium II salts for use in the working solution are the chloride ($PdCl_2$), the bromide ($PdBr_2$) and the acetate ($Pd(OAc)_2$); and the alkali metal chloro- and bromopalladites, such as potassium chloropalladite ($K_2PdCl_4$) and lithium chloropalladite ($Li_2PdCl_4$). Use of the palladous halide, $PdCl_2$ or $PdBr_2$, in the form of an alkali metal halopalladite, e.g., $Li_2PdCl_4$, is generally preferred. The palladium II salt, the important part of which is the Pd II portion thereof, should be soluble in the working solution in an amount to provide a dissolved palladium II salt concentration of from 0.001 to 0.1 mole, or higher, preferably 0.003 to 0.030 mole per liter. The palladium II salt can be charged to the working solution as one of the salts indicated above; or palladium metal, its oxide or carbonate may be charged and dissolved in the working solution.

The ionizable metal acetate is preferably cupric acetate or an alkali metal acetate, although the acetates of the alkaline earth metals and magnesium can be used, as can also zinc, cadmium, ferric, stannic, nickel and cobalt acetates. Such acetates can be charged as such or they can be formed by reaction of the oxides, hydroxides or carbonates of the indicated metals with the acetic acid component of the working solution. The metal acetate content of the working solution should be at least 0.01 molar, e.g., 0.01 to 1 molar; preferably it will be at least 0.1 molar, e.g., 0.1 to 0.5 molar. Concentrations exceeding the solubility of the metal acetate can be used. Metal acetate concentrations exceeding about 1 molar afford no particular added advantage, except when using cupric acetate, in which case, concentrations as high as 2.5 molar are advantageous for reasons explained below.

The most preferred metal acetate is cupric acetate, or a combination thereof with an alkali metal acetate. Cupric acetate will serve both as a source of acetate ions and as the oxidizing agent and its use at a concentration of 0.05 to 2.5, particularly 1.0 to 1.5 moles per liter, is preferred. At the higher of such concentrations, part of the cupric acetate will not dissolve and the initial mixture will be a slurry. However, as the reaction proceeds, the cupric acetate in solution is reduced to the cuprous salt and more of the cupric acetate dissolves. In the presence of the halide ion, the reduced cuprous ion will precipitate as the cuprous halide and, therefore, the working solution will generally be a slurry whose solid phase will be either cupric acetate, cuprous halide, or both.

The oxidizing agent of the working solution is a cupric salt such as the chloride, bromide or the acetate, the latter being preferred as indicated above. It will be charged to the working solution to provide a concentration therein of from 0.05 to 2.5, preferably 1 to 1.5, moles per liter. A high cupric salt content is desirable to provide a working solution of high synthesis capacity per cycle. As explained previously, the amount of cupric salt charged may exceed its solubility, but should not be so great as to result in a slurry which cannot be effectively agitated and transported, e.g., by pumping.

The presence of halide ion (chloride or bromide) in the working solution is desirable since halide ion increases the productivity of the system. The concentration of halide ion, i.e., dissolved $Cl^-$ or $Br^-$ but not precipitated halide such as precipitated cuprous chloride, will generally be at least 0.05 molar but not in excess of about 0.85 molar. At lower concentrations, productivity will be too low and conversions poor while higher concentrations, e.g., 0.9 molar or higher, will generally result in the production of excessive amounts of glycol derivatives and also in a reduction of the reaction rates. The preferred halide ion concentrations range from 0.2 to 0.6 molar. Halide ions may be supplied as cupric chloride or bromide as indicated above, or as the metal chloride or bromide of any of the other metals whose acetates have been indicated above. The preferred sources are the alkali metal and magnesium chlorides and bromides, particularly lithium and magnesium chlorides, especially when high acetate concentrations supplied as cupric acetate are to be used, as is preferred. As indicated previously, halides such as cuprous chloride, present in undissolved form in the working solution slurry are inert in the first stage reaction and should not be considered in calculating the halide ion concentration.

The reduced working solution from the synthesis step will generally be degassed to free it of unreacted ethylene (which may be recycled) and then fed to a stripping column where light boilers such as acetaldehyde, vinyl acetate, excess water and some acetic acid are stripped or distilled from the working solution.

In one-stage cyclic operations, the stripped working solution with the glycol acetates therein is recycled directly to the synthesis step. In the preferred two-stage system, such working solution is first cycled through the second stage where it is reacted with oxygen to regenerate the reduced oxidizing agent and then recycled to the synthesis step. If the acetaldehyde recovered in the stripping step is to be oxidized to acetic acid according to the method of the above Copelin application, the recovered acetaldehyde should be added to the stripped working solution and passed therewith through the oxidation or regeneration stage where it will be oxidized to acetic acid.

The invention is illustrated by the following examples. In the examples and throughout the specification, all composition percentages are by weight.

*Example 1*

A 300 cc. titanium-lined autoclave provided with an agitator was charged with the following:

|  | Grams | Moles/Liter |
|---|---|---|
| Glacial acetic acid | 97 | 1.57 |
| Cupric acetate monohydrate | 30 | 0.15 |
| Lithium chloride | 2 | 0.047 |
| Lithium acetate dihydrate | 1 | 0.01 |
| Glycol monoacetate | 1.4 | 0.0135 |
| Glycol diacetate | 1.5 | 0.0103 |
| Lithium chloropalladite | 0.25 | 0.00095 |
| Water | 5 | 0.28 |

The mixture was heated to 95° C. with agitation and the autoclave was charged with ethylene to a gauge pressure of 300 p.s.i. The temperature was maintained at 95 to 100° C. while ethylene was charged to maintain the gauge pressure at 200 to 300 p.s.i. After 15 minutes, the autoclave was cooled, the pressure blown down and the contents analyzed by vapor phase chromatography. Results were as follows:

|  | Grams | Moles/Liter |
|---|---|---|
| Glycol monoacetate present: |  |  |
| Initial | 1.4 | 0.0135 |
| Final | 1.1 | 0.0106 |
| Glycol diacetate present: |  |  |
| Initial | 1.5 | 0.0103 |
| Final | 1.0 | 0.0068 |

Based upon the cupric ion ($Cu^{++}$) reduced to cuprous ion ($Cu^{+}$), the conversions to vinyl acetate and acetaldehyde, respectively, were 69% and 31% and the mole ratio of acetaldehyde:vinyl acetate was 0.45:1. In a control test in which no glycol acetates were added to the working solution charge, the corresponding conversions to vinyl acetate and acetaldehyde, respectively, were 72% and 25.8% and the mole ratio of acetaldehyde:vinyl acetate was 0.36:1.

*Example 2*

The procedure of Example 1 was repeated employing, however, the following charge to the autoclave:

|  | Grams | Moles/Liter |
|---|---|---|
| Glacial acetic acid | 97 | 1.57 |
| Cupric acetate monohydrate | 30 | 0.15 |
| Zinc chloride | 7 | 0.51 |
| Zinc acetate dihydrate | 2 | 0.009 |
| Glycol monoacetate | 1.4 | 0.0135 |
| Glycol diacetate | 1.5 | 0.0103 |
| Lithium chloropalladite | 0.5 | 0.00095 |

Results were as follows:

|  | Grams | Moles/Liter |
|---|---|---|
| Glycol monoacetate present: |  |  |
| Initial | 1.4 | 0.0135 |
| Final | 1.2 | 0.0115 |
| Glycol diacetate present: |  |  |
| Initial | 1.5 | 0.0103 |
| Final | 1.2 | 0.0082 |

Based upon the cupric ion reduced, the conversions to vinyl acetate and acetaldehyde, respectively, were 70% and 20% and the mole ratio of acetaldehyde:vinyl acetate was 0.29:1. In a control test in which no glycol acetates were added to the charge, the corresponding conversions to vinyl acetate and acetaldehyde, respectively, were 73% and 18.2% and the mole ratio of acetaldehyde:vinyl acetate was 0.25:1.

*Example 3*

The procedure of Example 1 was repeated employing the following charge to the autoclave:

|  | Grams | Moles/Liter |
|---|---|---|
| Glacial acetic acid | 97 | 1.57 |
| Cupric acetate monohydrate | 30 | 0.15 |
| Nickelous chloride hexahydrate | 6 | 0.025 |
| Nickelous acetate tetrahydrate | 1.25 | 0.005 |
| Glycol monoacetate | 1.4 | 0.0135 |
| Glycol diacetate | 1.5 | 0.0103 |
| Lithium chloropalladite | 0.25 | 0.00095 |

Results were as follows:

|  | Grams | Moles/Liter |
|---|---|---|
| Glycol monoacetate present: |  |  |
| Initial | 1.4 | 0.0135 |
| Final | 1.2 | 0.0115 |
| Glycol diacetate present: |  |  |
| Initial | 1.5 | 0.0103 |
| Final | 0.9 | 0.0062 |

Based upon the cupric ion reduced, the conversions to vinyl acetate and acetaldehyde, respectively, were 73% and 15% and the mole ratio of acetaldehyde:vinyl acetate was 0.21:1. In a control test in which no glycol acetates were added to the charge, the corresponding conversions were 74.5% and 12.7%, respectively, and the mole ratio of acetaldehyde:vinyl acetate was 0.17:1.

The addition of glycol acetates to the autoclave charge generally suppresses slightly the reaction rate. However, the data of the above examples clearly show that glycol acetates added to the working solution charge are converted to a substantial extent to acetaldehyde in the synthesis step.

The presence in the working solution of chloride or bromide ions beneficially increases the rate of production of vinyl acetate. However, such ions tend to cause formation of glycol acetates and at concentrations thereof greater than about 0.85 mole per liter, the glycol acetates formed increase to a high concentration in the working solution and can be recovered and purified, if desired. At lower chloride or bromide ion concentrations, preferably 0.2 to 0.6 mole per liter, the glycol acetates are formed at a much lower rate, generally less than about 10% based upon the cupric ion reduced, which rate is sufficiently low to be balanced by the rate at which the glycol acetates are converted to acetaldehyde in the synthesis step. The resulting equilibrium concentration of glycol acetates in the working solution, generally less than 5% based upon the acetic acid content of the working solution, is affected somewhat by the water content of the working solution, higher concentrations of water tending to reduce the equilibrium concentration of glycol acetates and vice versa.

*Example 4*

A series of 18 recycle tests were made employing a titanium-lined 1-gallon autoclave to which the following were charged:

|  | Grams | Moles/Liter |
|---|---|---|
| Glacial acetic acid | 2010 | 33.5 |
| Cupric acetate monohydrate | 800 | 4.0 |
| Lithium acetate dihydrate | 28.1 | 0.276 |
| Lithium chloride | 29.4 | 0.69 |
| Palladium chloride | 5.68 | 0.032 |

The reaction in the synthesis step was effected at 90° C. and an ethylene pressure of 300 p.s.i.g. The autoclave was charged, sealed and pressured with ethylene until the reaction was complete. The pressure was then blown down and a still connected to the autoclave and the vinyl acetate and acetaldehyde produced were distilled off. Oxygen was then blown through the working solution in the autoclave to reoxidize cuprous ion to cupric ion, a sample of the working solution was removed for analysis and the cycle was repeated. Makeup acetic acid was added before the beginning of each cycle. The glycol diacetate content only of the working solution was followed since the monoacetate tends to convert to the diacetate in the cycle.

| After cycle No.: | Percent glycol diacetate in working solution, based on acetic acid |
|---|---|
| 3 | 0.56 |
| 6 | 0.81 |
| 9 | 0.92 |
| 12 | 0.96 |
| 15 | 0.92 |
| 18 | 0.95 |

The above data show that the concentration of glycol diacetate leveled off before about the ninth cycle.

Example 5

The general procedure of Example 4 was repeated using a 1-gallon autoclave charged initially with the following materials:

|  | Grams | Moles/Liter |
|---|---|---|
| Glacial acetic acid | 2110 | 35 |
| Cupric acetate monohydrate | 800 | 4 |
| Lithium acetate dihydrate | 143 | 1.40 |
| Lithium chloride | 88.2 | 2.08 |
| Palladium chloride | 5.68 | 0.032 |

The log of the temperature and ethylene pressure in the synthesis step of each cycle and of the glycol acetate contents (based on acetic acid) of the working solution at the end of each cycle is as follows:

| Cycle No. | Temp., °C. | Ethylene Press., p.s.i.g. | Percent Glycol Monoacetate | Percent Glycol Diacetate |
|---|---|---|---|---|
| 1 | 90 | 300 | 0.41 | 0.16 |
| 2 | 90 | 300 | | |
| 3 | 90 | 300 | 0.16 | 1.08 |
| 4 | 90 | 100 | 0.50 | 1.14 |
| 5 | 90 | 100 | 0.30 | 2.77 |
| 6 | 90 | 100 | 0.30 | 3.06 |
| 7 | 100 | 100 | 0.10 | 3.10 |
| 8 | 100 | 100 | 0.10 | 3.11 |

The above data show that the concentration of glycol acetates leveled out at about the sixth cycle.

The embodiments of the invention in which an exclusive property or privilege is claimed are as follows:

1. In a cyclic method for producing vinyl acetate which includes the steps of
   (a) reacting ethylene at a temperature of 50 to 160° C. and an ethylene pressure of 50 to 2000 p.s.i.g. with an acetic acid working solution of a palladium II salt, an ionizable metal acetate and a cupric salt oxidiging agent to produce vinyl acetate product and by-product glycol acetates and yield a reduced working solution;
   (b) removing said vinyl acetate product from the reduced working solution;
   (c) reacting the resulting residual reduced working solution with oxygen, whereby the same is reoxidized for reuse; and
   (d) recycling said reoxidized working solution to said step (a) for reaction with further amounts of ethylene, the improvement comprising recycling said reoxidized working solution with said by-product glycol acetates therein to step (a) whereby said glycol acetates are converted at least partially to acetaldehyde simultaneously with the reaction of said reoxidized working solution with ethylene in step (a).

2. In a cyclic method for producing vinyl acetate which includes the steps of
   (a) reacting ethylene at a temperature of 50 to 160° C. and an ethylene pressure of 50 to 2000 p.s.i.g. with an acetic acid working solution of a palladium II salt, an ionizable metal acetate, a cupric salt oxidizing agent and a metal halide providing halide ions of the group consisting of chloride and bromide ions at a concentration of 0.05 to 0.85 molar, to produce vinyl acetate product and by-product glycol acetates and yield a reduced working solution;
   (b) removing said vinyl acetate product from the reduced working solution;
   (c) reacting the resulting residual reduced working solution with oxygen, whereby the same is reoxidized for reuse; and
   (d) recycling said reoxidized working solution to said step (a) for reaction with further amounts of ethylene, the improvement comprising recycling said reoxidized working solution with said by-product glycol acetates therein to step (a) whereby said glycol acetates are converted at least partially to acetaldehyde simultaneously with the reaction of said reoxidized working solution with ethylene in step (a).

References Cited by the Examiner
UNITED STATES PATENTS 3,221,045  11/1965  McKeon et al. _____ 260—497

References Cited by the Applicant

Moiseev et al.: Doklady Akad. Nauk SSSR 133, 377 (1960).

LORRAINE A. WEINBERGER, *Primary Examiner.*

V. GARNER, *Assistant Examiner.*